(12) United States Patent
Uverud

(10) Patent No.: US 12,013,061 B2
(45) Date of Patent: Jun. 18, 2024

(54) SEAL RING AND CONDUIT CONNECTOR

(71) Applicant: TP-PRODUCTS AS, Drammen (NO)

(72) Inventor: Knut-Erik Uverud, Drammen (NO)

(73) Assignee: TP-PRODUCTS AS, Drammen (NO)

( * ) Notice: Subject to any disclaimer, the term of this patent is extended or adjusted under 35 U.S.C. 154(b) by 82 days.

(21) Appl. No.: 17/759,110

(22) PCT Filed: Jan. 25, 2021

(86) PCT No.: PCT/NO2021/050018
§ 371 (c)(1),
(2) Date: Jul. 20, 2022

(87) PCT Pub. No.: WO2021/154085
PCT Pub. Date: Aug. 5, 2021

(65) Prior Publication Data
US 2023/0043216 A1    Feb. 9, 2023

(30) Foreign Application Priority Data

Jan. 28, 2020  (NO) .................................. 20200110

(51) Int. Cl.
*F16L 23/20* (2006.01)
*F16J 15/06* (2006.01)
*F16L 23/16* (2006.01)

(52) U.S. Cl.
CPC .............. *F16L 23/20* (2013.01); *F16J 15/062* (2013.01); *F16L 23/162* (2013.01)

(58) Field of Classification Search
CPC ........ F16J 15/062; F16L 23/162; F16L 23/18; F16L 23/20; F16L 23/22
(Continued)

(56) References Cited

U.S. PATENT DOCUMENTS

| 1,821,866 | A | * | 9/1931 | Wilson ................... F16L 23/20 |
| | | | | 285/341 |
| 1,873,855 | A | * | 8/1932 | Wilson ................... F16L 23/20 |
| | | | | 285/341 |

(Continued)

FOREIGN PATENT DOCUMENTS

| GB | 2552698 A | 2/2019 |
| WO | 9318331 A1 | 9/1993 |

OTHER PUBLICATIONS

International Search Report and Written Opinion of the International Searching Authority from the European Patent Office, in PCT/NO2021/050018 dated Apr. 13, 2021, which is an international application corresponding to this U.S. application.

(Continued)

*Primary Examiner* — David Bochna
(74) *Attorney, Agent, or Firm* — Kolitch Romano Dascenzo Gates LLC

(57) ABSTRACT

An annular seal ring is provided, including an inner sealing portion and an outer sealing portion, disconnected from each other allowing them to move completely freely relative to each other during operation. The seal ring is located in a cavity, formed when the first and second hubs of a conduit connector are connected. The seal ring includes a support rib and a mating groove, and the support rib is adapted to interact with the groove under certain combinations of pressure and temperature.

6 Claims, 5 Drawing Sheets

(58) Field of Classification Search
USPC .................................. 285/368, 364, 363
See application file for complete search history.

(56) References Cited

U.S. PATENT DOCUMENTS

| | | | | |
|---|---|---|---|---|
| 3,215,442 | A * | 11/1965 | Papenguth | F16L 23/22 |
| | | | | 277/611 |
| 5,570,911 | A * | 11/1996 | Galle | F16L 23/20 |
| | | | | 285/379 |
| 2001/0045709 | A1 | 11/2001 | Stobbart | |
| 2005/0242519 | A1 * | 11/2005 | Koleilat | F16L 23/18 |
| | | | | 277/434 |
| 2011/0266797 | A1 * | 11/2011 | Stobbart | F16L 23/20 |
| | | | | 277/612 |
| 2011/0316239 | A1 * | 12/2011 | Holliday | F16L 23/20 |
| | | | | 277/602 |
| 2012/0193874 | A1 * | 8/2012 | Melancon | F16L 23/20 |
| | | | | 277/324 |
| 2015/0176744 | A1 * | 6/2015 | Glassman | F16J 15/062 |
| | | | | 277/609 |
| 2016/0186905 | A1 * | 6/2016 | Askestad | F16L 23/18 |
| | | | | 285/367 |
| 2019/0301609 | A1 * | 10/2019 | Schneider | F16J 15/062 |
| 2022/0221057 | A1 * | 7/2022 | Mckay | F16J 15/061 |

OTHER PUBLICATIONS

Norwegian Search Report from the Norwegian Patent Office, in Patent Application No. 20200110 dated Aug. 28, 2020, which is a foreign counterpart application corresponding to this U.S. Patent Application, to which this application claims priority.

* cited by examiner

-- Prior Art --

SEAL RING AND CONDUIT CONNECTOR

TECHNICAL FIELD

The present disclosure regards a seal ring for use in conduit connections, pressure vessels or the like.

BACKGROUND

In subsea pressure piping and equipment systems several methods exist for providing sufficient sealing for their conduit connections.

When connecting adjacent sections of fluid flow conduits or vessels, seal rings are typically interposed at the interface of adjacent connecting flanged conduits or vessel portions which are then bolted or clamped together. The seal ring is typically metallic, the seal being affected by elastic or plastic deformation of a sealing surface of the seal ring against sealing portions of the ranged portions.

These systems are intended to resist leakage in conduit connections from internal pressures, external pressures or both; bi-directional pressure. Typically, these annular sealing systems are inserted into pre-machined tapered grooves of which the conduit sealing function is accomplished as a combination of geometry, smooth surface finish and high contact stress between annular seal rings and conduit grooves.

Annular sealing systems as described above can be divided into two different sealing principles:

Load Controlled Seals, Often Called Gaskets

The ring is permanently deformed due to high forces applied to the top and bottom of the ring transferred via the seal groove contact faces. The gasket material is softer than the ring groove material. This leads to a reliable metal to metal barrier, provided the force on the gasket is high enough to achieve the required contact pressure to seal for the fluid in question. However these seals have very little spring back and the sealing ability is hence quickly lost under separating loads. The load controlled gaskets are not suitable under dynamic loads because they allow movement between the mating parts.

Deformation Controlled Metal Seals

The deformation-controlled seals have their contact force with the seats defined by the given displacement of the seats, radially, axially or combined, and the stiffness of the seal defined by its geometry and material properties. The obtained seal contact force during the assembly of the connection under normal design conditions is not affected by the loads transmitted through the connection. Such seals are also often denoted "non-load bearing seals".

The geometry of such annular seals is of critical importance, as they are designed to provide sufficient contact force between the conduit seal groove and the annular seal to accomplish a reliable metal to metal seal. However, some annular seal designs, often referred to as "self-energized" or "pressure assisted" seals, make use of a specific annular seal geometry and the fluid or gas pressure from inside the conduit, the externally or both, from which the pressure(s) enhances the conduit connection's sealing capabilities.

A prior art for such a non-load bearing self-energized annular seal is exemplified by US20010045709A1, which demonstrates an H shaped seal in a groove like the one used in this disclosure, formed by a conduit joint. The seal consists of two pairs of seal lips connected through a web. The inner sealing portion, outer sealing portion and web are all made integrally from one homogenous material.

Current seal designs fail to provide sufficient bi-directional sealing in conduit joints, should there be pressure imbalance either internally or externally, where either an increased pressure from one side or the other may create a pressure breach either radially inside or outside the conduit joint, compromising the system's overall sealing capabilities.

SUMMARY

The object of the present disclosure is to provide a non-load bearing self-energized metal to metal annular seal ring assembly for conduit connections that provides a barrier against leakage from both internal pressures, external pressures or combined, intended for use in, but not limited to, subsea environments.

Said objects are achieved in a conduit connector and seal ring as defined in the appended claims.

Devices of the present disclosure will require less bolt/clamp force to energize the annular sealing system during assembly than prior art. The annular sealing system comprising of at least two individual annular portions designed as a system, and which under certain conditions the annular portions will work independently and under other conditions will work as one seal with interacting portions.

BRIEF DESCRIPTION OF THE DRAWINGS

Certain features and functions of the present disclosure will be described with reference to the following appended figures in which.

DETAILED DESCRIPTION

Figure 1:
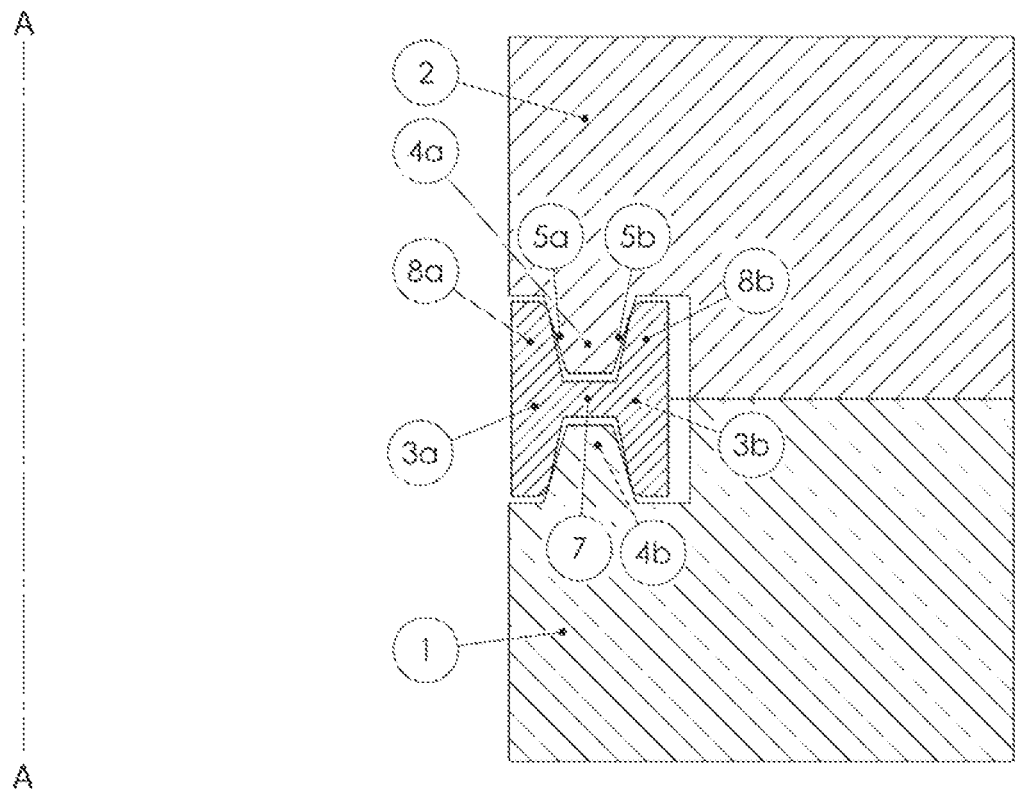
FIG. 1 is a cross section through a part of a prior art conduit connector with an annular seal ring.

FIG. 1 is a cross section through a prior art non-load bearing self-energized conduit connector connecting a first hub 1 and a second hub 2. The conduit connector has axial symmetric geometry about the centerline A-A on the left hand side of the cross section. The left hand side is a mirror image of the right hand side. In the mating end surfaces of the hub there are machined grooves for accepting an H-shaped seal ring 3. The grooves include truncated projections with tapered sidewalls 5a, b adapted to contact inner and outer seal lips 8a, b on the seal ring. The seal ring is homogenous consisting of outer and inner sealing portions 3a, b which are firmly connected to each other through a web 7. If the internal fluid pressure in the connector is substantially higher than the external pressure, the internal pressure will exert a force on the inner lips 8a that increases the contact pressure against the protrusions 4a, b. However, this force will be transferred to the outer lips 8b through the web 7 lowering the contact exerted by these lips against the opposite sidewalls 5b of the protrusions 4a, b. This means that the sealing ability of the internal seal portion is improved, while the sealing ability against the outside of the connector is compromised. Such a high difference in pressure as described above can cause more plastic deformation to the firm web, which will further reduce the contact-pressure between the seal-lips and the grooves.

Figure 2:
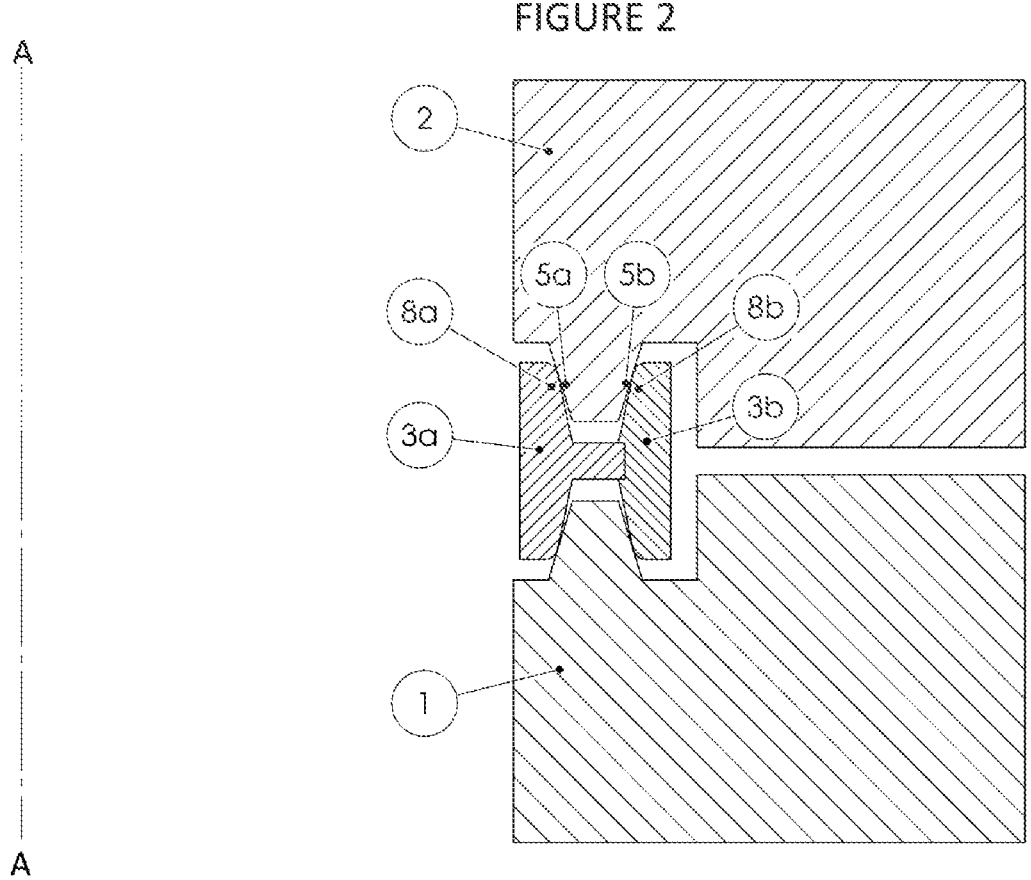
FIG. 2 is a corresponding cross section through a conduit connector with an annular seal ring according to the present disclosure as unassembled.

FIG. 2 illustrates a non-load bearing self-energized seal ring in a conduit connector according to the present disclosure connecting a first hub 1 and a second hub 2. In the mating end surfaces of the hub there are machined grooves for accepting an H-shaped annular seal ring 3a, b. The grooves include truncated projections with tapered sidewalls 5a, b adapted to contact inner and outer seal lips 8a, b on the seal ring. The seal ring 3a, b comprises an inner annular portion 3a and an outer annular portion 3b, which outer annular portion 3b is coaxially positioned relative to the inner annular portion 3a.

The annular seal ring consists of at least two independent annular sealing portions which are manufactured independently and joined together to a system prior to assembly. A possible assembly method is to shrink the inner annular seal portion 3a relative to the outer annular seal portion 3b.

Figure 3:
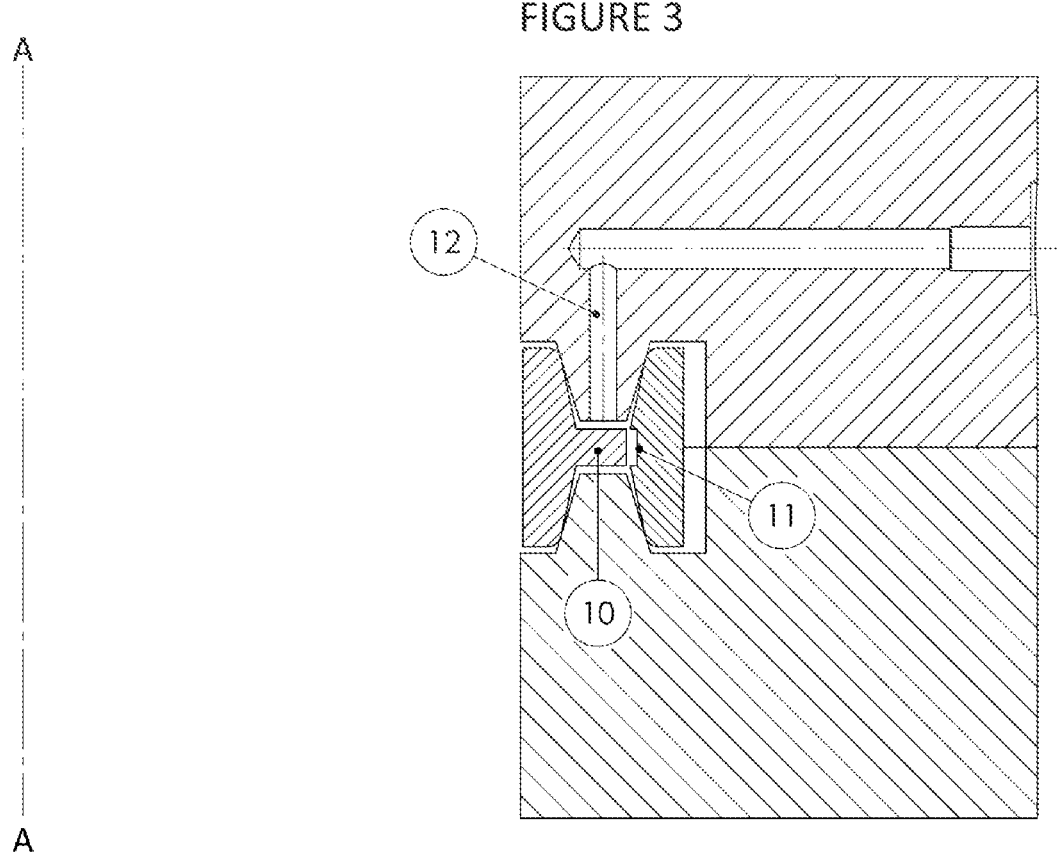
FIG. 3 is a cross section through the inventive conduit connector as assembled.

When the seal ring is mounted into the conduit connector, the portions 3a, b become separated by the wedging action provided by tapered sidewalls 5a, b and act as independent sealing portions under normal load-conditions, as shown in FIG. 3.

Figure 6:
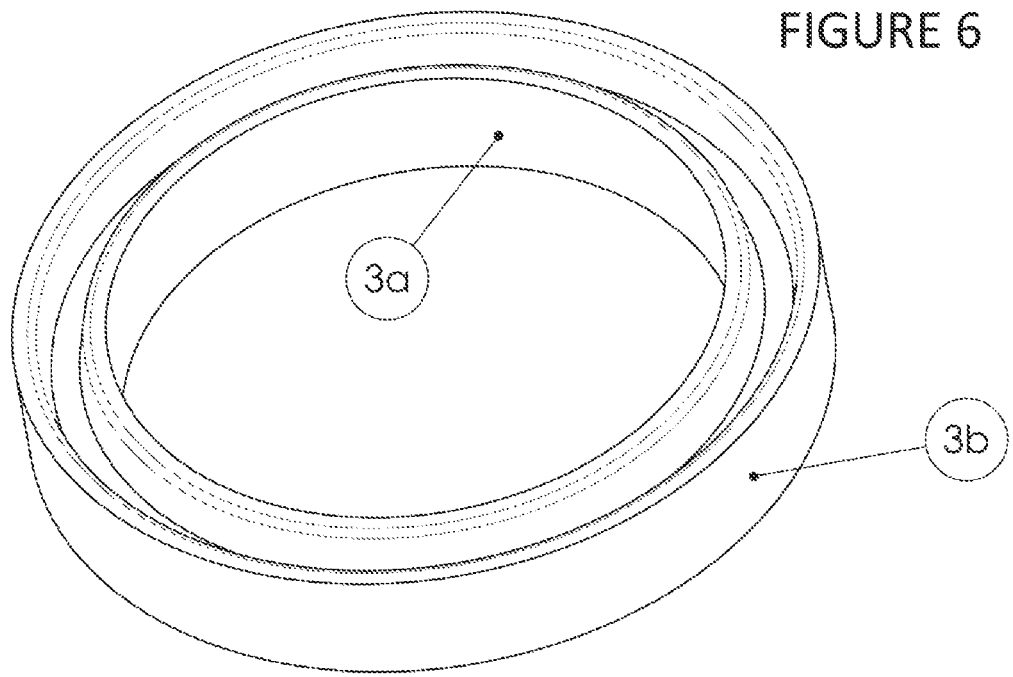
FIG. 6 is a perspective view of the inventive seal ring.

FIG. 6 shows the inventive seal ring as seen in perspective with an outer seal portion 3b and an inner seal portion 3a.

If the internal fluid pressure in the connector is substantially higher than the external pressure, the internal pressure will only affect the inner annular portion 3a. As the seal ring 3a, b is in two-part form the forces exerted on the inner annular portion 3a will not be transferred to the outer annular portion 3b.

Conversely, if the external fluid pressure in the connector is substantially higher than the internal pressure, the external pressure will only affect the outer annular portion 3b. As the seal ring 3a, b is in two-part form the forces exerted on the external annular portion 3b will not be transferred to the outer annular portion 3a.

The inner annular portion 3a and the outer annular portion 3b may be produced from different materials such as different metals or metal alloys, different polymers or combinations of the above. The use of different materials in the annular portions will give different properties and behavior when exposed to pressure and temperature to accommodate the different conditions on the inside and the outside of the seal ring.

FIG. 3 also illustrates the presence of an outer support rib 10 projecting from inner annular portion 3a. On the corresponding outer annular portion 3b there is a mating inner groove 11. In an unstressed condition a slip distance exists between the outer circumference of the outer support rib 10 and the bottom of the inner groove 11. If the differential pressure over the seal ring 3 exceeds the maximum allowable value, the outer support rib 10 will contact the bottom of the inner groove 11. This will allow the inner annular portion 3a and the outer annular portion 3b to support each other preventing the seal ring 3a, b from being damaged, as shown in FIG. 4.

Figure 5:
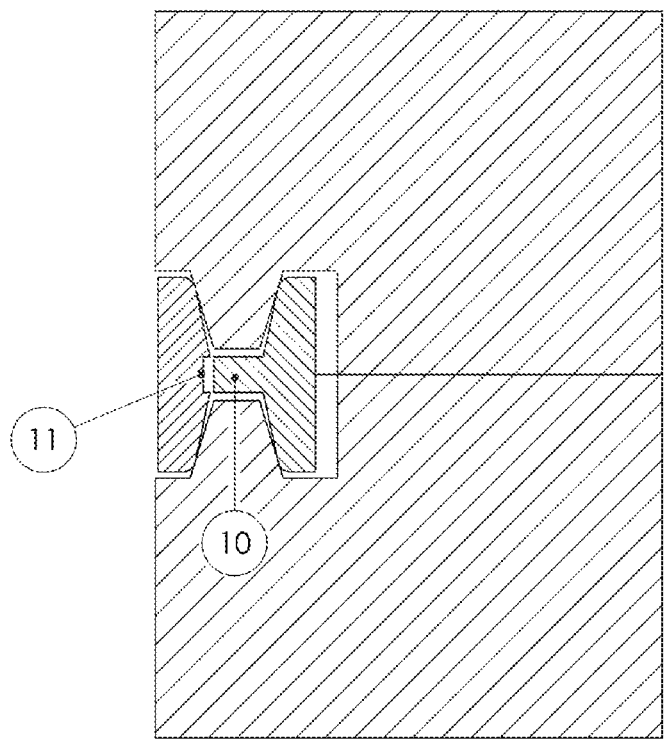
FIG. 5 is a cross section through a conduit connector holding another embodiment of the inventive seal ring.

Alternatively, the rib 10 may be on the outer sealing portion 3b and the groove 11 may be on the inner sealing portion 3a as illustrated in FIG. 5.

Figure 4:
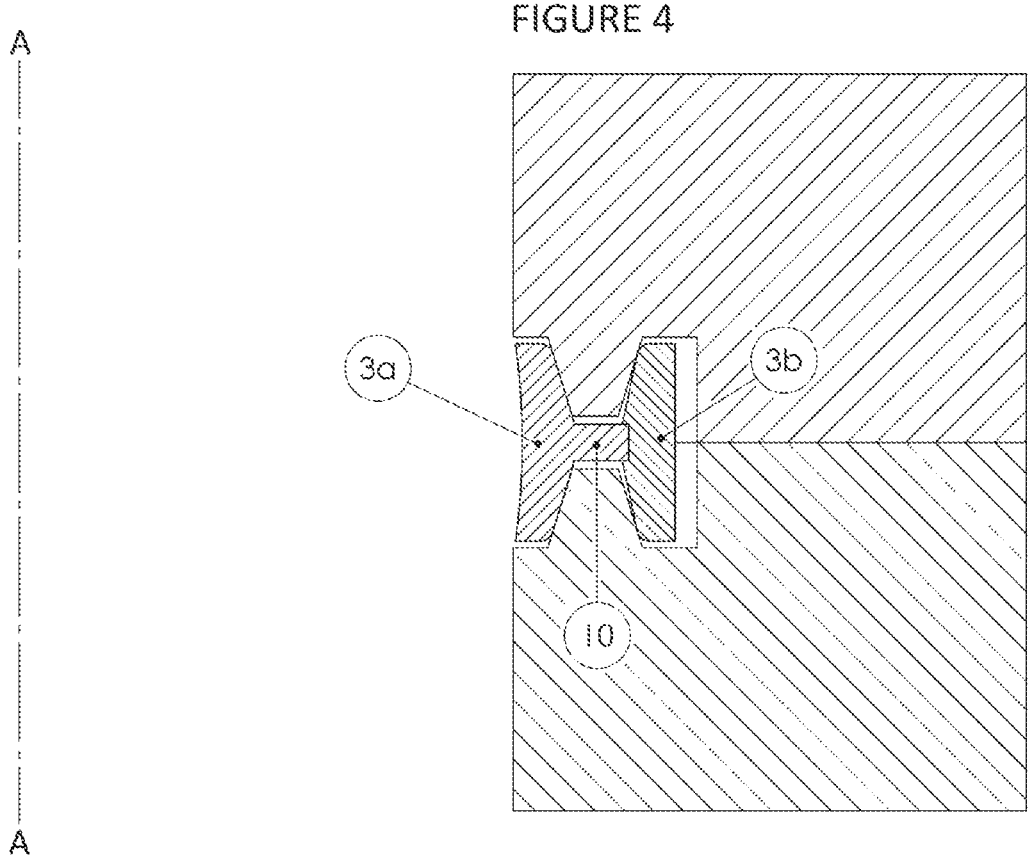
FIG. 4 is a cross section through the inventive conduit connector as assembled when subject to an overly high differential pressure over the seal ring.

FIG. 4 illustrates how the interaction between the inner sealing portion and the outer sealing portion in an assembled connector can be regained under certain combinations of designed stiffness, pressure and temperature. Specifically, here the fluid pressure inside the tubing is overly high and the inner sealing portion has yielded to the pressure. The support rib 10 is in contact with the bottom of the groove 11. This means that the inner sealing portion is supported by the outer sealing portion avoiding a collapse of the inner sealing portion.

FIG. 3 also illustrates how the hubs 1, 2 and seal ring 3a, b form a protected cavity. This cavity may be a convenient location for a pressure tapping test port 12, and for sensors for assessing the integrity of the conduit connector. There may be conducted a verification test of correct assembly without compromising the integrity of the conduit prior to start of production. Pressure and temperature sensors may be mounted in this protected cavity for monitoring pressure and temperature during operation without compromising the integrity of the conduit. Additional instrumentation may be mounted inside this cavity, such as sensors for measuring humidity. The signals from sensors and electronics inside the protected cavity may be transferred from the cavity adjacent to the production fluid.

The expression 'conduit connector', as used in this description, is not limited to mean only connectors connecting tubular elements. In addition the seal ring may find applications wherever two bodies are to be joined through a sealed connection, such as connecting different parts of a pressure vessel.

The invention claimed is:

1. A conduit connector, including:
   a first hub (1) with a first cavity section;
   a second hub (2) with a second cavity section;
   wherein said first and second cavity sections form a cavity when the first and second hubs are connected;
   wherein the first cavity section includes a first protrusion (4a) with inner and outer tapering sidewalls (5a, b), and the second cavity section includes a second protrusion (4b) with inner and outer tapering sidewalls (5a, b);
   wherein the first protrusion (4a) is facing the second protrusion (4b) when the first and second hubs (1, 2) are connected;
   a seal ring located in said cavity;
   wherein the seal ring includes an inner annular sealing portion (3a) and an outer annular sealing portion (3b), wherein the sealing portions (3a, b) are disconnected from each other allowing the inner and outer sealing portions to move completely freely relative to each other during operation;
   the inner sealing portion (3a) comprising a pair of inner annular seal lips (8a);
   the outer sealing portion (3b) comprising a pair of outer annular seal lips (8b);
   the lips (8a) of the inner sealing portion (3a) engaging the inner sidewalls (5a) of the first and second protrusions (4a, b);
   the lips of the outer sealing portion (3b) engaging the outer sidewalls (5b) of the first and second protrusions (4a, b);
   wherein the inner annular sealing portion (3a) is separated from the outer annular sealing portion (3b) by wedging action provided by the tapered sidewalls (5a, b);
   wherein fluid pressure inside the connector is configured to only act on and affect the inner sealing portion (3a), and fluid pressure outside the connector is configured to only act on and affect the outer sealing portion (3b); and
   wherein the inner sealing portion (3a) comprises a support rib (10) and the outer sealing portion (3b) comprises a mating groove (11), the support rib (10) being adapted to interact with the groove (11) under certain combinations of pressure and temperature.

2. The conduit connector according to claim 1, further including a test port (12) in the cavity between the inner sealing portion (3a) and the outer sealing portion (3b) for pressure and/or temperature readings.

3. The conduit connector according to claim 1, where the inner sealing portion (3a) and the outer sealing portion (3b) are manufactured from different materials configured to give different properties and behavior when exposed to pressure and temperature to accommodate different conditions inside and outside of the seal ring.

4. A conduit connector, including:
a first hub (1) with a first cavity section;
a second hub (2) with a second cavity section;
wherein said first and second cavity sections form a cavity when the first and second hubs are connected;
wherein the first cavity section includes a first protrusion (4a) with inner and outer tapering sidewalls (5a, b), and the second cavity section includes a second protrusion (4b) with inner and outer tapering sidewalls (5a, b);
wherein the first protrusion (4a) is facing the second protrusion (4b) when the first and second hubs (1, 2) are connected;
a seal ring located in said cavity;
wherein the seal ring includes an inner annular sealing portion (3a) and an outer annular sealing portion (3b), wherein the sealing portions (3a, b) are disconnected from each other allowing the inner and outer sealing portions to move completely freely relative to each other during operation;
the inner sealing portion (3a) comprising a pair of inner annular seal lips (8a);
the outer sealing portion (3b) comprising a pair of outer annular seal lips (8b);
the lips (8a) of the inner sealing portion (3a) engaging the inner sidewalls (5a) of the first and second protrusions (4a, b);
the lips of the outer sealing portion (3b) engaging the outer sidewalls (5b) of the first and second protrusions (4a, b);
wherein the inner annular sealing portion (3a) is separated from the outer annular sealing portion (3b) by wedging action provided by the tapered sidewalls (5a, b);
wherein fluid pressure inside the connector is configured to only act on and affect the inner sealing portion (3a), and fluid pressure outside the connector is configured to only act on and affect the outer sealing portion (3b); and
wherein the inner sealing portion (3a) comprises a groove (11) and the outer sealing portion (3b) comprises a mating support rib (10), the support rib (10) being adapted to interact with the groove (11) under certain combinations of pressure and temperature.

5. The conduit connector according to claim 4, further including a test port (12) in the cavity between the inner sealing portion (3a) and the outer sealing portion (3b) for pressure and/or temperature readings.

6. The conduit connector according to claim 4, where the inner sealing portion (3a) and the outer sealing portion (3b) are manufactured from different materials configured to give different properties and behavior when exposed to pressure and temperature to accommodate different conditions inside and outside of the seal ring.

* * * * *